United States Patent [19]

Kappei

[11] 3,847,242

[45] Nov. 12, 1974

[54] APPARATUS FOR ANCHORING AN EXCHANGEABLE BATTERY BOX IN THE CARRIAGE OF A BATTERY DRIVEN VEHICLE

[76] Inventor: Freidhelm Kappei, Am Pfingstanger 9, 3163 Sehnde, Germany

[22] Filed: Jan. 2, 1973

[21] Appl. No.: 320,199

[30] Foreign Application Priority Data
Jan. 5, 1972 Germany.................. 7200321[U]

[52] U.S. Cl.................. 180/68.5, 105/51, 312/333
[51] Int. Cl.............................................. B60k 1/04
[58] Field of Search......... 180/68.5, 65, 60; 105/51, 105/50; 104/34; 312/333

[56] References Cited
UNITED STATES PATENTS
1,209,962   12/1916   Heath .............................. 180/68.5

1,774,236   8/1930   Ohnstrand ...................... 312/333 X
1,843,691   2/1932   Mancha et al. ................... 105/50 X FOREIGN PATENTS OR APPLICATIONS
1,044,688   6/1953   France ............................. 180/68.5
494,300     3/1930   Germany ............................. 105/51

*Primary Examiner*—David Schonberg
*Assistant Examiner*—Milton L. Smith
*Attorney, Agent, or Firm*—Roland I. Griffin

[57] ABSTRACT

A battery driven vehicle is provided with a pair of guide rails and with a battery box supported for movement along the guide rails. The battery box may be releasably secured in place on the guide rails by moving spring-loaded levers pivotally mounted at the opposite ends of each guide rail into engagement with corresponding abutments fixedly mounted at the opposite ends of the battery box.

2 Claims, 4 Drawing Figures

APPARATUS FOR ANCHORING AN EXCHANGEABLE BATTERY BOX IN THE CARRIAGE OF A BATTERY DRIVEN VEHICLE

BACKGROUND AND SUMMARY OF THE INVENTION

This invention is related to apparatus for anchoring an exchangeable battery box on the guide rails provided therefor in the carriage of a battery driven vehicle. It is periodically necessary to exchange the battery forming the drive for such vehicles as its capacity is only sufficient for a relatively short driving operation. Thus, it is desired to enable the battery box to be quickly and easily exchanged and secured in the vehicle such that the battery box will not be displaced or loosened even under rough driving conditions. Previously known devices for this purpose are either of a complicated construction or are difficult to handle so that they do not meet these requirements.

It is the object of this invention to provide apparatus for quickly and simply securing a battery box in place on the guide rails provided therefor in the carriage of a battery driven vehicle. A further object of this invention is to provide apparatus for doing this while taking into account the usual tolerances in the dimensions of the different battery boxes that might be used.

These objects are accomplished according to the preferred embodiment of this invention by providing arresting members for engaging the battery box with the carriage and for automatically following the ends of the battery box and/or the carriage. These arresting members preferably comprise levers pivotally mounted at the carriage or at the battery box and corresponding abutments fixedly mounted at the battery box or at the carriage. The abutments comprise raised wedge-like working surfaces against which the levers are spring loaded.

An especially simple arrangement is characterized in that the abutments are located at the opposite ends of the battery box and provided with raised wedge-like paths and in that the levers are hand-levers pivotally mounted at the carriage or at the opposite ends of the guide rails themselves and spring loaded against these working surfaces. The hand-levers include guiding latches and guiding rollers or the like with which the hand-levers engage the corresponding raised wedge-like working surfaces of the abutments. The mountings for the hand-levers have sufficient lateral clearance that the hand-levers may be pivoted out of engagement with the corresponding raised wedge-like working surfaces of the abutments and moved laterally out of the path of movement of the battery box when it is being exchanged. The hand-levers may be held in place out of the path of the battery box by engaging them with suitably located and formed rest mounts.

The inventive concept allows different embodiments, the preferred one of which is illustrated in the enclosed drawings.

DESCRIPTION OF THE PREFERRED EMBODIMENT

Figure 1:
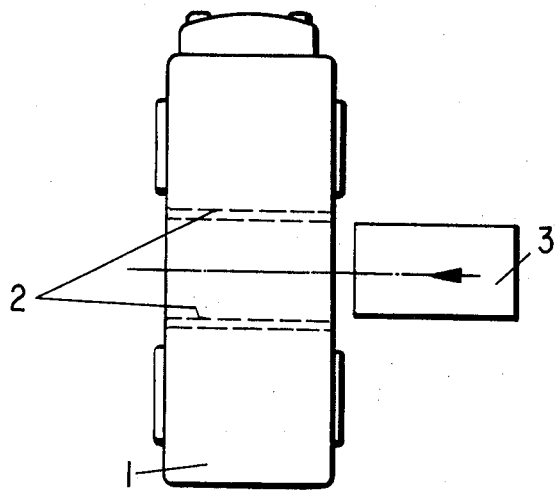
FIG. 1 is a schematic top view of a battery driven vehicle and a battery box therefor
Figure 4:
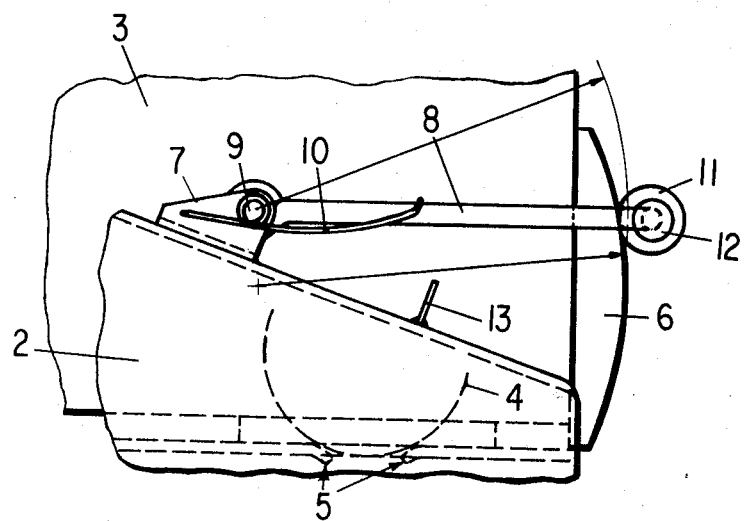
FIG. 4 is an enlarged representation of the locking apparatus of FIGS. 2 and 3 employing a guiding roller rather than a guiding latch.
Figure 2:
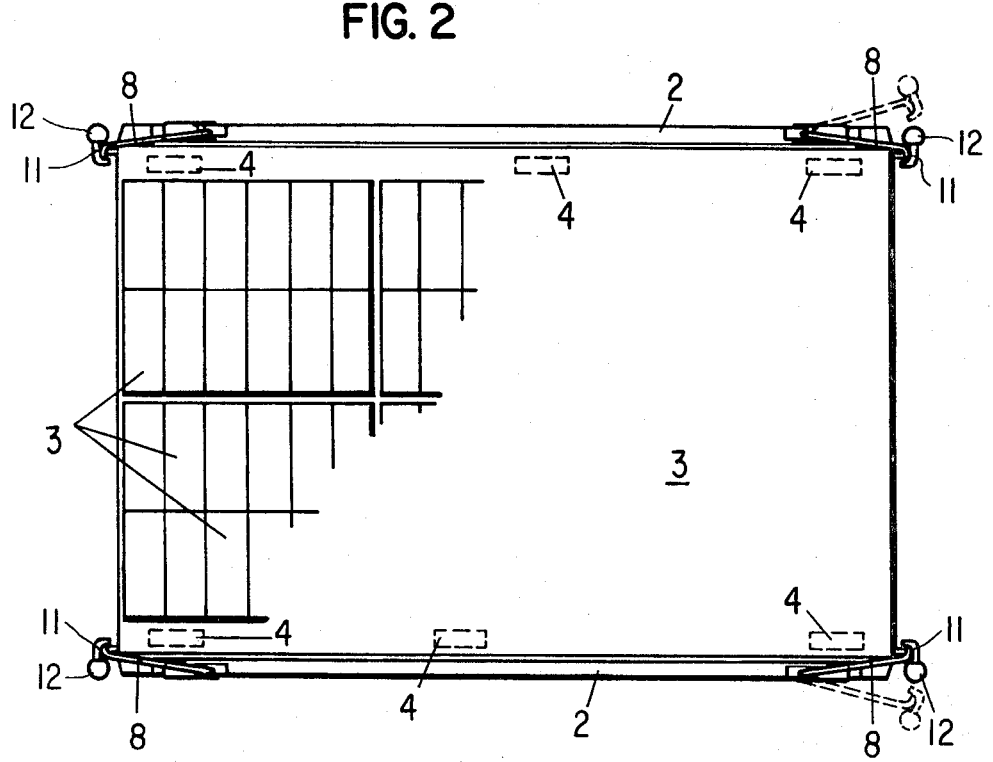
FIG. 2 is a top view of a battery box located on the guide rails in the carriage of the vehicle of FIG. 1 and of locking apparatus according to the preferred embodiment of this invention.
Figure 3:
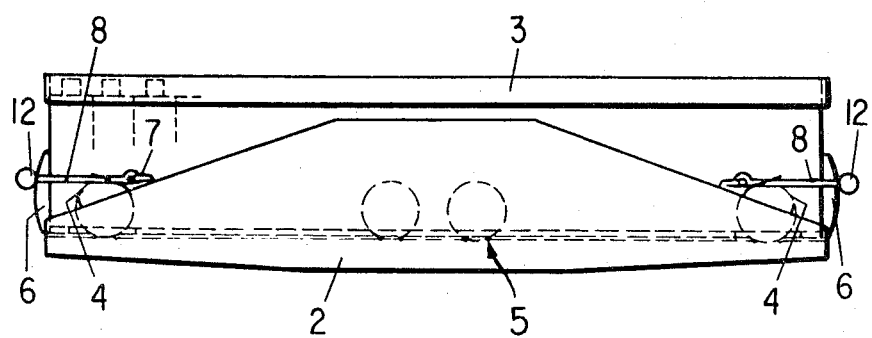
FIG. 3 is a side view of the battery box, guide rails, and locking apparatus of FIG. 2.

As illustrated in FIGS. 1 and 2, the battery driven vehicle 1 includes a pair of laterally extending guide rails 2 positioned between its axles. The battery box 3, carrying individual battery cells 3', is laterally inserted into the guide rails 2. Battery box 3 has displaced rollers 4 by which it is supported on and moved along guide rails 2. When battery box 3 is in the entered position, rollers 4 are arrested in recesses 5 formed in guide rails 2 as shown in FIGS. 3 and 4. In this position the battery box should be secured. The arresting apparatus described below with specific reference to FIGS. 2-4 is employed for this purpose.

At the ends of each guide rail 2 there are provided mounting blocks 7 in which hand-levers 8 are mounted on pivot pins 9 with sufficient clearance that the hand-levers can be displaced up and down. Each hand-lever 8 is spring loaded by a spring 10 surrounding the corresponding pivot pin 9. A handle 12 and a guiding latch 11 (see FIGS. 2 and 3) or a guiding roller (see FIG. 4) 11 are mounted on the outer end of each hand-lever 8. The hand-levers 8 are also mounted with sufficient lateral clearance that they can be pivoted laterally across their pivot axes and inserted into rest-forks 13 under the action of springs 10. Lateral abutments 6 are provided at the ends of battery box 3 opposite hand-levers 8. These abutments form raised wedge-like rolling surfaces for guiding latches or rollers. 11.

When battery box 3 is to be exchanged, all hand-levers 8 are first pivoted upwards against the action eaction of springs 10 to raise the hand-levers out of engagement with abutments 6. Hand-levers 8 are then automatically laterally displaced into the positions indicated by the dashed lines in FIG. 2 and are inserted into the corresponding rest-forks 13. This permits the battery box to be exchanged without difficulty. The newly entered battery box should then be secured in its operating position. This is accomplished by raising hand-levers 8 out of rest-forks 13 and pivoting them into engagement with corresponding abutments 6 in the newly entered battery box as illustrated in FIGS. 2-4. Springs 10 push the respective hand-levers 8 from above onto the corresponding abutments 6 where guiding latches or rollers 11 engage the raised wedge-like roller surfaces of the abutments. The raised wedge-like roller surfaces of abutments 6 adjust for the tolerances in the dimensions of the battery boxes used.

I claim:

1. Apparatus for anchoring an exchangeable battery box in guiding means provided therefor in a carriage of a battery driven vehicle, said apparatus comprising a plurality of hand-levers each pivotally mounted at one end thereof on one of the carriage and an end portion of the guiding means for the battery box, and a plurality of corresponding abutments each mounted on the other of the carriage and an end portion of the guiding means for the battery box and provided with a raised wedge-like surface, each of the hand-levers carrying at the other end thereof a guiding latch or roller for engaging the raised wedge-like surface of the corresponding abutment and being spring loaded for urging that guiding latch or roller into engagement with that raised wedge-like surface, all of the hand-levers being mounted with sufficient lateral clearance that they can be pivoted out of the path of movement of the battery box when it is being exchanged.

2. Apparatus as in claim 1 wherein the guiding means for the battery box includes means for holding each of the hand-levers in a rest position out of the path of movement of the battery box.

* * * * *

UNITED STATES PATENT OFFICE
CERTIFICATE OF CORRECTION

Patent No. 3,847,242           Dated November 12, 1974

Inventor(s) Friedhelm Kappei

It is certified that error appears in the above-identified patent and that said Letters Patent are hereby corrected as shown below:

On the title page, section [76] change "Freidhelm" to --Friedhelm--;

Column 1, line 42, change "paths" to --working surfaces--;

Column 1, line 46, change "and" to a comma;

Column 1, line 46, after "rollers" insert a comma;

Column 1, line 63, after "therefor" insert a period;

Column 2, line 35, delete the period between "rollers" and "11"; and

Column 2, line 38, delete "eaction".

Signed and sealed this 29th day of April 1975.

(SEAL)
Attest:

RUTH C. MASON
Attesting Officer

C. MARSHALL DANN
Commissioner of Patents
and Trademarks